(12) United States Patent
Sauerländer et al.

(10) Patent No.: US 6,381,160 B1
(45) Date of Patent: Apr. 30, 2002

(54) CONVERTER COMPRISING RESONANT CIRCUIT ELEMENTS

(75) Inventors: Georg Sauerländer, Aachen (DE); Hubert Casper Raets, Landgraaf (NL); Thomas Dürbaum, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/585,735

(22) Filed: Jun. 2, 2000

(30) Foreign Application Priority Data

Jun. 4, 1999 (DE) .......................... 199 25 490

(51) Int. Cl.$^7$ .............................................. H02M 7/00
(52) U.S. Cl. ...................................................... 363/124
(58) Field of Search .............................. 363/16, 17, 95, 363/97, 124, 131, 132

(56) References Cited

U.S. PATENT DOCUMENTS

| | | | | |
|---|---|---|---|---|
| 4,912,374 A | * | 3/1990 | Nagase et al. ............... | 315/244 |
| 5,053,937 A | | 10/1991 | Blockl ......................... | 363/16 |
| 5,159,541 A | * | 10/1992 | Jain ............................ | 363/26 |
| 5,563,777 A | * | 10/1996 | Miki et al. ................... | 363/37 |
| 6,097,614 A | * | 8/2000 | Jain et al. ................... | 363/16 |

FOREIGN PATENT DOCUMENTS

| | | | |
|---|---|---|---|
| EP | 0726696 A2 | 8/1996 | ........... H05B/41/29 |
| EP | 0726696 A3 | 8/1996 | ........... H05B/41/29 |
| EP | 0758160 A1 | 2/1997 | .......... H02M/7/538 |
| GB | 2306062 A | 4/1997 | ............ H02M/1/00 |

OTHER PUBLICATIONS

STR–Z4000 Series of the firm of Allegro–Sanken data sheet, Nov. 1995.
Controller–IC MC 34067 of Motorola data sheet 1996.

\* cited by examiner

*Primary Examiner*—Matthew Nguyen
(74) *Attorney, Agent, or Firm*—Daniel J. Piotrowski

(57) ABSTRACT

The invention relates to a converter comprising switching elements for chopping a direct voltage, in which turn-on phases of the switching elements alternate with one another, and comprising a circuit arrangement with resonant circuit elements processing the chopped direct voltage and serving for the supply of an output voltage. To improve such a converter in such a way that zero voltage switching (ZVS) can be ensured in an extended range of converter operations with possibly inexpensive converter modifications, it is proposed that the length of the dead-time phases, which are present between two consecutive turn-on phases and during which the switching elements are turned off, is automatically adapted so that switching losses, which occur particularly when the switching elements are turned on, can be minimized.

13 Claims, 4 Drawing Sheets

CONVERTER COMPRISING RESONANT CIRCUIT ELEMENTS

FIELD OF THE INVENTION

The invention relates to a converter comprising switching elements for chopping a direct voltage, in which turn-on phases of the switching elements alternate with one another, and comprising a circuit arrangement with resonant circuit elements processing the chopped direct voltage and serving for the supply of an output voltage.

BACKGROUND OF THE INVENTION

Converters of this type generally represent switched-mode power supplies which are used for DC power supply of a load connected to the output of the switched-mode power supply. In such switched-mode power supplies, an AC voltage at the input is rectified so as to obtain a DC voltage at the converter input. However, the invention also relates to converters whose inputs receive a direct voltage directly from a DC voltage source. The DC input voltage is chopped by means of a bridge circuit consisting of switching elements. The chopped DC voltage is applied to a circuit arrangement comprising resonant circuit elements, i.e. inductive and capacitive reactances so that an approximately sinusoidal alternating current flows in the circuit arrangement. There should be at least an inductive and at least a capacitive resonant circuit element. A load may be connected at the output of the circuit arrangement and hence at the output of the converter. By adapting the switching frequency, an adaptation to variations of the load and input voltage fluctuations is effected. Converters with resonant circuit elements, i.e. resonance converters, allow operation at high switching frequencies of the switching elements and thus realize relatively small-volume and lightweight devices as regards possible power output. When resonance converters are used, particularly also zero-voltage switching (ZVS) is possible with a small number of circuit components. In this connection, ZVS refers to turning on switching elements (rendering them conducting) at a minimal switching element voltage, preferably near zero volt. In ZVS, the circuit arrangement with the resonant circuit elements has an inductive input impedance as considered from the side of the switching elements. In the case of ZVS, MOSFET transistors are commonly used as switching elements.

To allow ZVS, dead-time phases must be provided in which all converter-switching elements are turned off (i.e. rendered non-conducting). As is known, the length of the dead-time phases is adapted to different fields of use (see, for example, STR-Z4000 series of the firm of Allegro-Sanken, data sheet November 1995, or the Controller-IC MC 34067 of Motorola, data sheet 1996—both ICs are used for switching element control). In the IC of the firm of Allegro-Sanken, this is done, for example, by means of an external resistor, and in the IC of Motorola this is done by fixing a resistance-capacitance combination. ZVS in the given converter structures can of course only be guaranteed for limited ranges of operation. Outside these ranges of operation, for example, in the case of large input voltage differences or large load differences to be processed, essential modifications of the converter are necessary so that particularly its manufacturing costs will increase to an undesirably high extent. In the case of erroneous adaptation of the dead-time phases and the resultant disabled ZVS, the switching losses will increase, which in extreme cases may lead to destruction of the switching elements.

SUMMARY OF THE INVENTION

It is an object of the invention to improve the converter of the type described in the opening paragraph to such an extent that ZVS can be ensured in a wider range of operation of the converter and with possibly inexpensive converter modifications.

This object is achieved by an automatic adaptation of the length of the dead-time phases which are present between two consecutive turn-on phases and during which the switching elements are turned off.

The converter according to the invention allows ZVS within a wider range of operation. Switching losses occurring when turning on the switching elements can be minimized. Moreover, it can be adapted to various fields of applications while using a small number of components. Moreover, the invention allows a simple adaptation of the converter in the case of changes of the output power to be supplied, in the case of changing to other switching element types (for example, to another MOSFET transistor type with other parasitic capacitances) or in the case of using other converter components, or a change of tolerance ranges in the converter components used. The required dead-time adaptation can be achieved by an appropriate and easy-to-realize adaptation of the control circuits used for controlling the switching elements, i.e. particularly by means of appropriately programmed ICs. The converter output supplies particularly a direct voltage controlled to a fixed value. However, the use of the converter for supplying a constant direct current is also possible. Basically, the converter could also supply an alternating voltage or an alternating current; for this case, a rectifier arrangement at the output of the converter would not be required.

To realize the automatic adaptation of the length of the dead-time phases, two variants are proposed. In a first variant, a first measuring device is provided for measuring a voltage decreasing across one of the switching elements and a first comparison device is provided for generating a comparison signal causing the switching elements to be turned on when the switching element voltage reaches a first threshold value during a dead-time phase. In the second variant, a second measuring device is provided for measuring the variation with respect to time of a voltage decreasing across one of the switching elements, and a second comparison device is provided for generating a comparison signal when the variation with respect to time of the switching element voltage falls below a second threshold value during a dead-time phase, said comparison signal causing the switching element to be turned on.

The first variant requires a more elaborate measuring device than the second. In contrast, however, the first variant allows a more precise adaptation of the length of the dead-time phases than the second.

In a further embodiment of the converter according to the invention, a timer is provided for predetermining the maximum length of the dead-time phases. This is an additional safety measure which also prevents the maximum length of the dead-time phases from being exceeded in the case of erroneous adaptations.

The invention also relates to a control circuit constructed particularly as an integrated circuit (IC) for controlling at least one of the switching elements of the converter according to the invention, which control circuit is provided for supplying control signals effecting an automatic adaptation of the length of the dead-time phases which are between two consecutive turn-on phases and during which the switching elements are turned off.

BRIEF DESCRIPTION OF THE DRAWINGS

These and other aspects of the invention are apparent from and will be elucidated with reference to the embodiments described hereinafter.

In the drawings.

DETAILED DESCRIPTION OF PREFERRED EMBODIMENT

Figure 1:
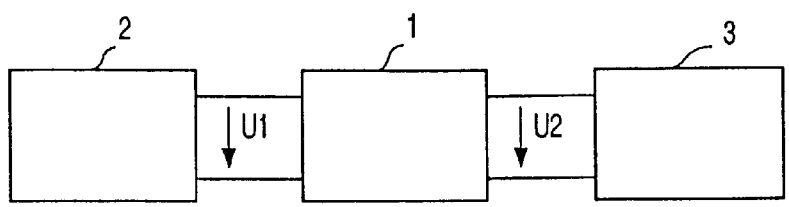
FIG. 1 is a block diagram of a circuit arrangement comprising a resonance converter.

The block diagram in FIG. 1 shows a resonant converter—here a switched-mode power supply—with a circuit block 1 for converting a DC input voltage U1 into an output voltage U2 here a direct voltage which is used for supplying a load represented by a block 3. The input voltage U1 is generated in the conventional manner for switched-mode power supplies by rectifying an alternating voltage from an AC voltage mains.

Figure 2:
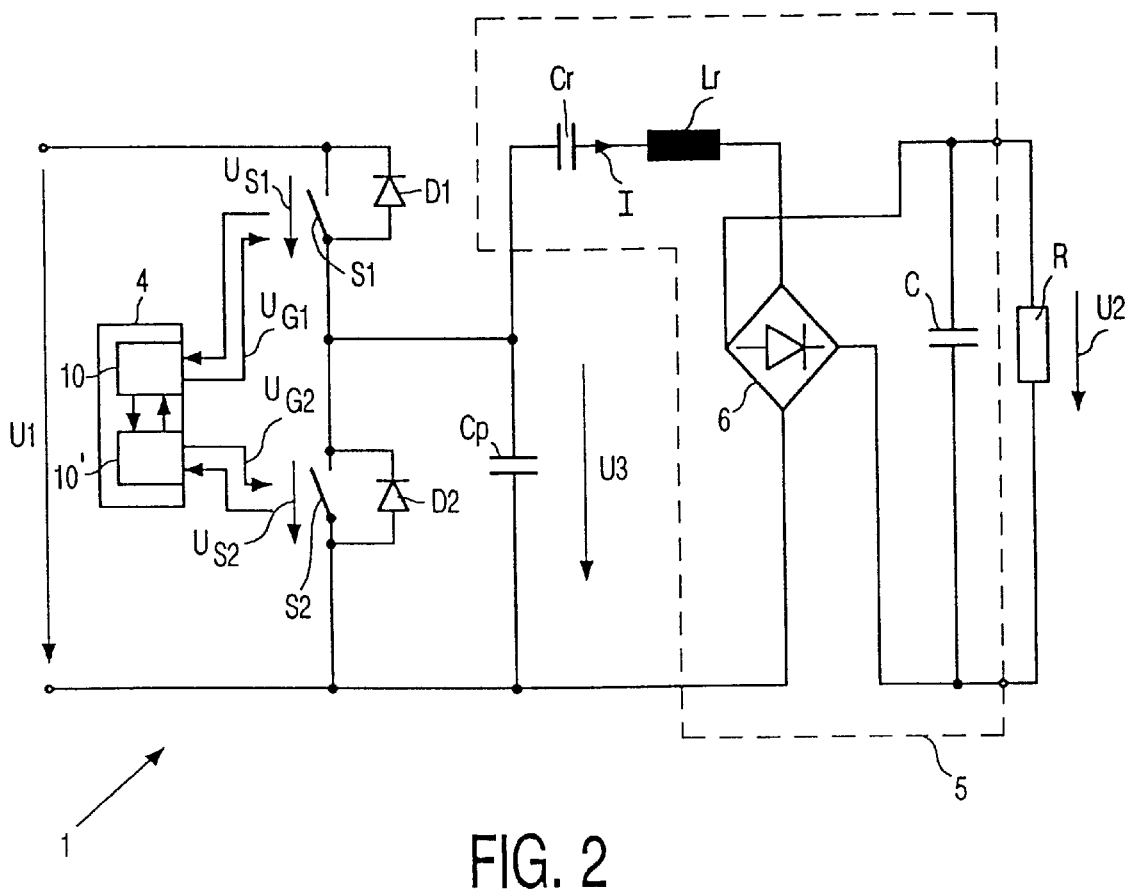
FIG. 2 shows the circuit structure of a resonance converter according to the invention.

FIG. 2 shows in a more detailed manner the essential elements of the converter shown in FIG. 1. The DC input voltage U1 is present at a half bridge of series-arranged switching elements S1 and S2 which chop the direct voltage U1. The switching elements S1 and S2 are MOSFET transistors in this case, which comprise so-called body diodes D1 and D2 shown as diodes arranged antiparallel to the corresponding switching element S1 or S2. The switching elements S1 and S2 are controlled by a control unit 4 which to this end also measures and evaluates the voltages $U_{S1}$ and $U_{S2}$ at the switching elements S1 and S2. For each switching element, the control unit 4 has its own control circuit, a first control circuit 10 being used for controlling the switching element S1 and a second control circuit 10' being used for controlling the switching element S2. The control unit 4 may be realized on a single integrated circuit (IC), together with the control circuits 10 and 10'. The control circuits 10 and 10' may, however, also be realized by means of separate ICs. By means of the control unit 4 and the control circuits 10 and 10', the automatic adaptation of the length of dead-time phases according to the invention is ensured, which will be elucidated hereinafter.

A capacitance Cp, which conveys a chopped direct voltage U3 during operation of the converter 1, is arranged parallel to the switching element S2. The capacitance Cp particularly combines the parasitic capacitances of the switching elements S1 and S2 when they are realized as MOSFET transistors, as in the present embodiment. However, the capacitance Cp may also comprise further additional capacitors. The chopped direct voltage U3 is applied to a circuit arrangement 5 comprising resonant circuit elements and generating a DC output voltage U2. The circuit arrangement 5 in the present embodiment comprises a capacitance Cr and an inductance Lr as resonant circuit elements which are arranged in series. A rectifier arrangement 6, which rectifies a current I flowing through the resonant circuit elements Cr and Lr and, as usual, supplies said current to a smoothing capacitor C which is arranged at the output and from which the DC output voltage U2 can be taken, is arranged between the series arrangement of the capacitance Cr and the inductance Lr and the capacitance Cp in the direction of the converter output. In FIG. 2, the DC output voltage U2 is present at a load R which is shown as an ohmic resistor in this case. Basically, the converter 1 may also be used for supplying an alternating voltage instead of a direct voltage. In such a case, a rectification by means of a rectifier arrangement and a smoothing capacitor would not be required and the output voltage would be equal to the alternating voltage at the rectifier arrangement 6 in the embodiment shown in FIG. 2.

The DC input voltage U1 is converted to the chopped direct voltage U3 by alternately turning the switching elements S1 and S2 on (rendering them conducting) and off (rendering them non-conducting). When the switch S1 is turned on, the switch S2 is turned off. When the switch S2 is turned on, the switch S1 is turned off. Between the end of a turn-on phase of the switch S1 and the start of a turn-on phase S2, there is a dead-time phase in which the two switching elements S1 and S2 are turned off. Between one end of a turn-on phase of the switching element S2 and the start of the next turn-on phase of the switching element S1, there is also such a dead-time phase. By providing such dead-time phases, zero-voltage switching (ZVS) will be possible. The length of the turn-on and turn-off phases of the switching elements S1 and S2 is adjusted by means of a control unit 4, which will be further elucidated with reference to FIG. 7. By adapting the switching frequency, a constant output voltage is also ensured in the case of load fluctuations and fluctuations of the input voltage.

Figure 3:
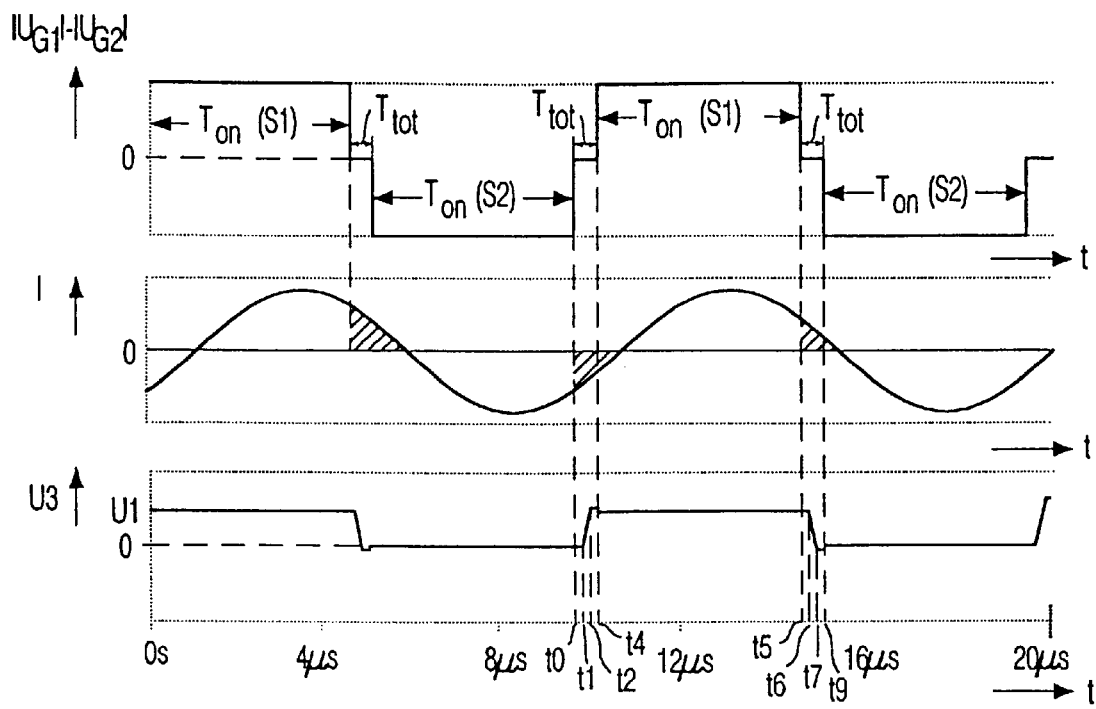
FIG. 3 shows curves for correctly adjusted lengths of the dead-time phases.

FIG. 3 shows curves with correctly adjusted lengths of the dead-time phases. The upper one of the three diagrams describes the difference $|U_{G1}|-|U_{G2}|$ of the value of the control voltage $U_{G1}$ at the switching element S1 and the value of the control voltage $U_{G2}$ at the switching element S2. The control voltages used as control signals for controlling the switching elements S1 and S2 represent corresponding gate voltages of the MOSFET transistors. When the difference between the amounts of the control voltages is zero, there is a dead-time phase which is denoted by $T_{tot}$. When the switching element S1 is turned on by applying an appropriate control voltage $U_{G1}$ to the control input of this switching element, then there are the time intervals denoted by $T_{on}(S1)$. In these time intervals, the control voltage $U_{G2}$ is zero so that the switching element S2 is turned off. The time intervals in which the switching element S2 is turned on and the switching element S1 is turned off are denoted by $T_{on}(S2)$. During these time intervals, the control input of the switching element S2 receives a control voltage $U_{G2}$ different from zero, which control voltage turns on the switching element S2. Within these time intervals, the control voltage $U_{G1}$ is zero. The central diagram in FIG. 3 shows the variation with respect to time of the current flowing through the resonant circuit elements Cr and Lr. Finally, the lower diagram in FIG. 3 shows the time variation of the voltage U3 at the parasitic capacitance Cp. All the time axes of the three diagrams with a time t plotted on them are drawn on the same scale.

The change between the turn-on and turn-off states of the switching elements S1 and S2 will hereinafter be elucidated by way of example, with reference to the change between the single switching cycles. At the instant t0, the control voltage $U_{G2}$ is set to zero so as to turn off the switching element S2. This leads to a discharge at the gate electrode of the MOSFET transistor used for realizing the switching element S1. Until the end of this discharge, the switching element S2 is of course still conducting so that the current I which is negative at this instant still flows through the switching element S2. From the instant t1, the switching element S2 is finally turned off so that no current can flow through it any longer. The current I further flowing on the basis of the energy stored in the inductance Lr now charges the capacitance Cp from the instant t1 and thus raises the voltage U3. At the instant t2, the voltage U3 has finally reached the value of the DC input voltage U1 so that the diode D1 starts conducting. From this instant, it is ensured that the switching element S1 is turned on below a switching element voltage $U_{S1}$ of substantially 0 volt (ZVS at the diode forward voltage). A short time after the instant t2—at the instant t4—the switching element S1 is turned on by applying a corresponding control voltage $U_{G2}$. A time interval $T_{on}(S1)$ with the switching element S1 turned on and the switching element S2 turned off is thereby initiated.

At the instant t5, this time interval $T_{no}(S1)$ is terminated by setting the control voltage $U_{G1}$ to zero. This in turn leads to a discharge at the gate electrode of the MOSFET transistor used for realizing the switching element S1. At the instant t6, this discharge has been ended to such an extent that the switching element S1 starts blocking, i.e. changes to the turned-off state, so that the current I which is positive at this instant leads to a discharge of the capacitance Cp and thereby to a drop of the voltage U3. At the instant t7, the voltage U3 has reached the value of zero so that the diode D2 starts conducting from this instant and the switching element S2 can be turned on below a switching voltage $U_{S2}$ of substantially 0 volt (at the diode forward voltage), which is effected a short time after a corresponding control voltage $U_{G2}$ is applied at the instant t9. From this instant, a time interval $T_{on}(S2)$ starts, in which the switching element S2 is turned on and the switching element S1 is turned off.

Both between the instants t0 and t4 and between the instants t5 and t9, there is a so-called dead-time phase during which both the control voltage $U_{G1}$ and the control voltage $U_{G2}$ are zero and are thus present as control voltages which are effective as turn-off control signals. The dead-time phases $T_{tot}$ are adjusted in such a way that ZVS is possible. In the I(t) diagram, the shaded areas are a measure of the available energy for recharging the capacitance Cp (and also in FIGS. 4 to 6). In the case shown in FIG. 3, the available energy is present to a sufficient extent.

Figure 4:
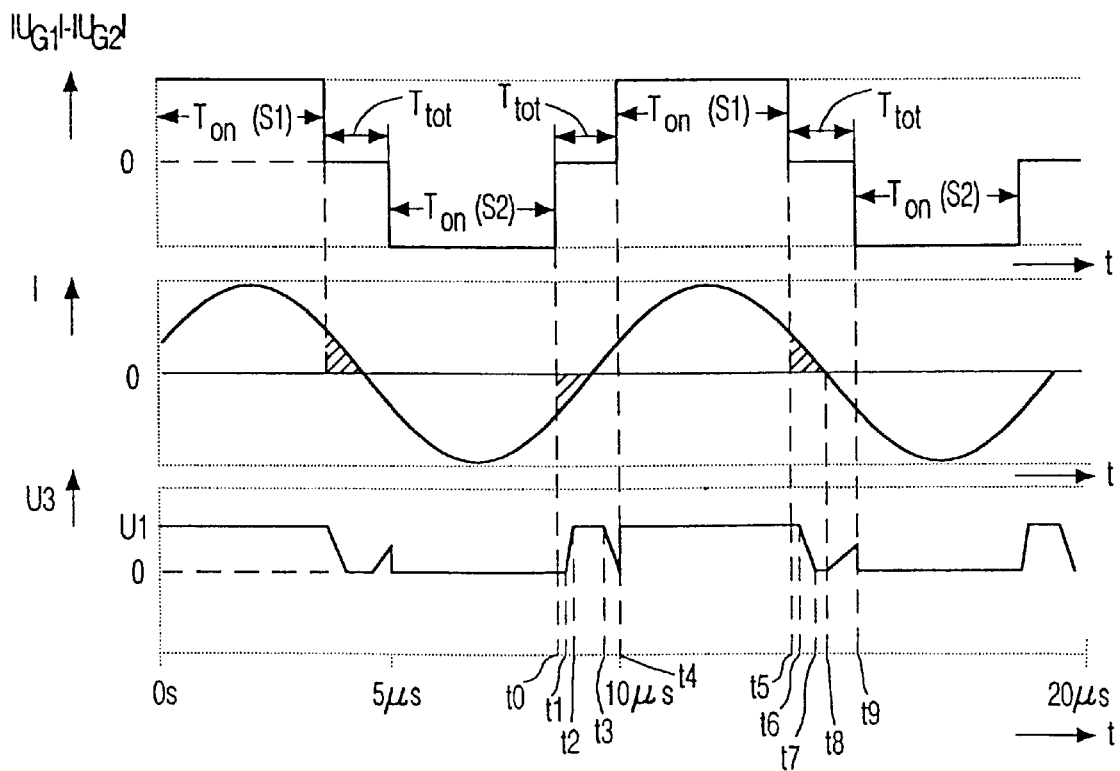
FIG. 4 shows curves for dead-time phases which are too long.

FIG. 4 shows curves for the case of longer dead-time phases. Here, an unwanted drop of the voltage U3 starts at the instant t3 between the instants t2 and t4 because of the reversal of the sign of the current I, which voltage U3 has increased at the instant t2 to the value of the DC input voltage U1. As a result, the diode D1 is not in its conducting state when the switching element S1 is turned on at the instant t4, so that the switching element S1 cannot be turned on without voltage or at a very small voltage but at an increased switching element voltage $U_{S1}$. The same applies to the instant t8 when there is also an unwanted recharging of the capacitance Cp (i.e. an increase of the voltage U3). The switching element S2 is thus neither turned on without a voltage at the instant t9 (more precisely, at the small forward voltage of the diode D2). In the case shown in FIG. 4, with a dead-time $T_{tot}$ which is adjusted too large, switching losses occur which may lead to a greater heat development and possibly to a destruction of the switching elements S1 and S2.

Figure 5:
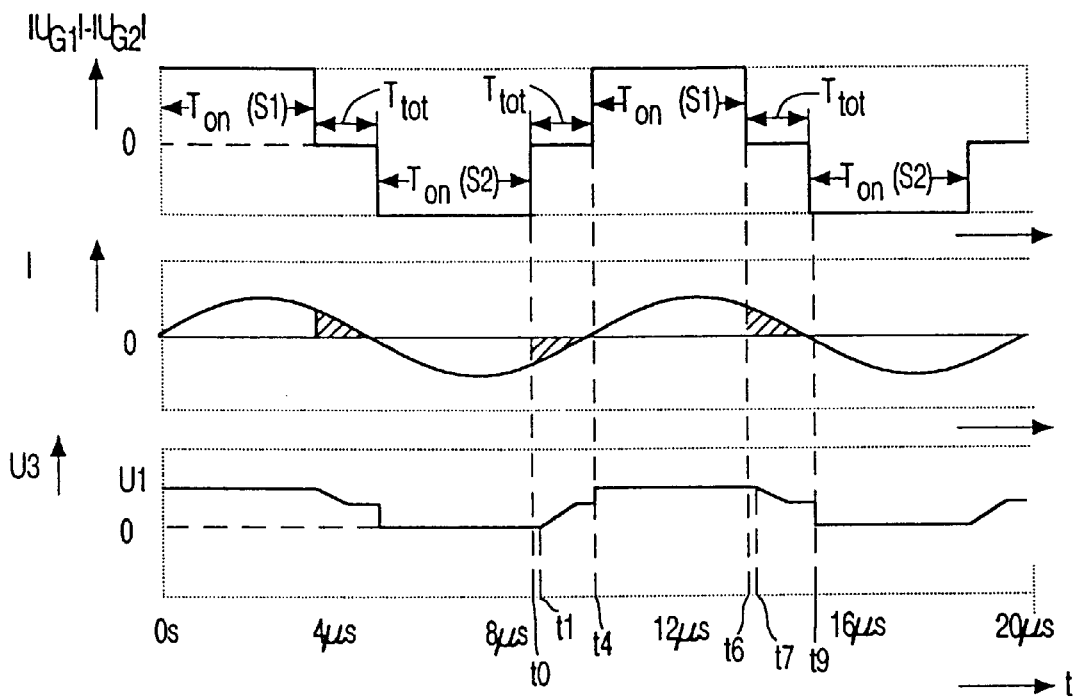
FIG. 5 shows curves for the case where the energy stored in the resonant circuit elements does not reach the optimum minimal amount.

FIG. 5 shows a case in which the energy stored in the inductance Lr (the shaded areas in the I(t) diagram represent a measure for this) is not large enough to recharge the capacitance Cp between the instants t1 and t4 and t7 and t9 to such an extent that the voltage U3 has been raised to the value of the DC input voltage U1 at the instant t4 or lowered to the value of zero at the instant t9. In this case, it is unavoidable that the switching elements S1 and S2 are turned on at raised switching element voltages $U_{S1}$ and $U_{S2}$. The switching element S1 will then preferably be turned on at the end of a dead-time phase $T_{tot}$ when the variation with respect to time (the difference quotient) of the voltage U3 reaches a threshold value (preferably the value of zero). This also applies to the instant when the switching element S2 is turned on (instant t9). Here, too, the switching element S2 is turned on at the end of the previous dead-time phase $T_{tot}$ when the change (the difference quotient) of the decreasing voltage U3 reaches a threshold value (preferably the threshold value of zero). In this way, the switching losses are minimized also in this unfavorable case.

Figure 6:
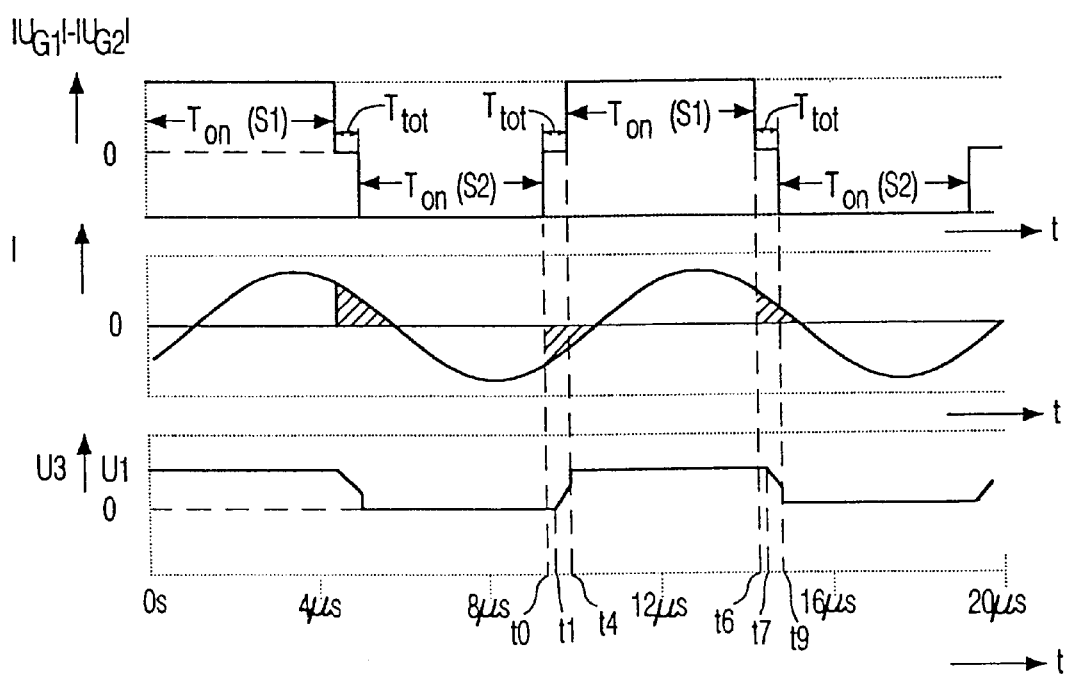
FIG. 6 shows curves for too short lengths of the dead-time phases.

Finally, FIG. 6 shows a case in which the length of the dead-time phases $T_{tot}$ is adjusted to be too short. In this case, the required recharge of the capacitance Cp is not yet completely terminated at the end of a dead-time phase, i.e. when the switching element S1 is turned on (instant t4), the voltage U3 has not yet risen to the value of the DC input voltage U1, and when the switching element S2 is turned on (instant t9), the voltage U3 has not yet decreased to such an extent that the diode D2 conducts. In the case shown in FIG. 6, the switching elements S1 and S2 are turned on at switching element voltages US, and $U_{S2}$, respectively, which voltages may be smaller in the case of sufficiently long dead-time phases. Therefore, avoidable switching losses are generated in the case shown in FIG. 6.

Figure 7:
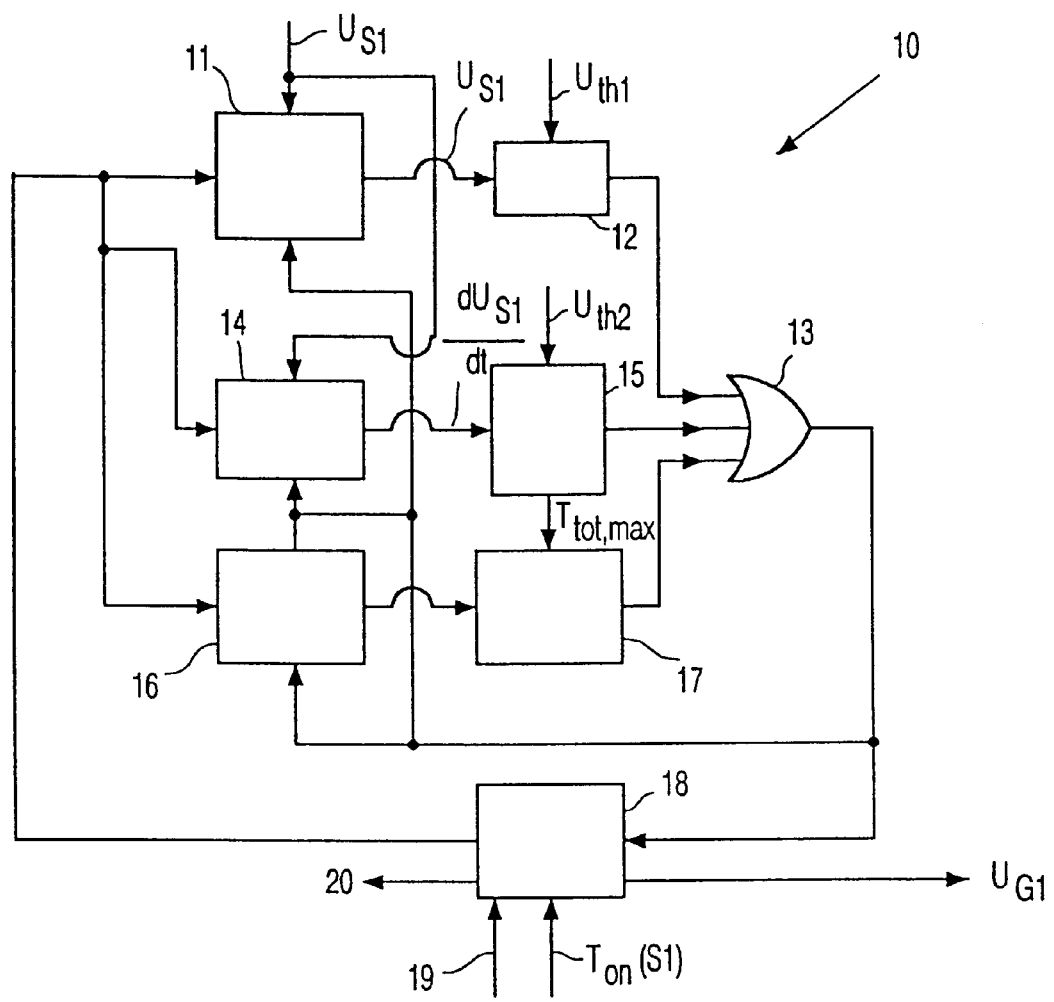
FIG. 7 is a block diagram of a control circuit arrangement for controlling the switching elements.

FIG. 7 is a block diagram showing the basic structure of the control circuit 10 used for controlling the switching element S1. A function block 11 comprises a measuring and evaluation device which applies the measured voltage $U_{S1}$ or a signal equivalent to this voltage to a comparison device 12 during the dead-time phases $T_{tot}$ which immediately precede the turn-on phases $T_{on}(S1)$ of the switching element S1. This comparison device compares the signal applied to it with a first threshold value $U_{th1}$. When the first threshold value is reached, a set signal corresponding to a logic "one" is applied to an OR-gate 13.

The control circuit 10 further comprises circuit elements combined in a function block 14 which determine difference quotients of the switching element voltage $U_{S1}$ present during the dead-time phases $T_{tot}$ immediately preceding the turn-on phases $T_{on}(S1)$ and apply this quotient to a second comparison device 15 which compares the difference quotients $dU_{S1}/dt$ with a second threshold value $U_{th2}$. When the second threshold value $U_{th2}$ is reached, a set signal corresponding to a logic "one" is applied to the OR-gate 13.

The control circuit 10 also comprises a timer 16 which starts every time at the start of a dead-time phase $T_{tot}$ immediately preceding a turn-on phase $T_{on}(S1)$, and applies a corresponding timing signal to a comparison device 17 which compares this supplied timing signal with a predeterminable maximally admissible dead-time phase length $T_{tot,max}$. When this maximum dead-time phase length is reached, the comparison device 17 applies a set signal corresponding to a logic "one" to the OR-gate 13.

When the output of the OR-gate 13 supplies a logic "one", it initiates a turn-on phase $T_{on}(S1)$ or ends the corresponding preceding dead-time phase $T_{tot}$. When a logic "one" is present at the output of the OR-gate 13, the timer 16 is reset and circuit means combined in a function block 18 apply a control signal $U_{G1}$ acting as a turn-on signal to the control input of the switching element S1 during a predeterminable turn-on phase $T_{on}(S1)$. Furthermore, the function block 18 includes circuit means which activate the measuring and evaluation devices in the function blocks 11 and 14 and the timer 16 after the end of the turn-on phase $T_{on}(S2)$. A corresponding activation signal, used as an enable signal for the measuring and evaluation devices of the function blocks 11 and 14 and as a trigger signal for the timer 16, is applied by the function block 18 to the function blocks 11, 14 and 16 at this instant. This is done at the instant when the function block 18 receives a signal 19 at the end of a turn-on phase $T_{on}(S2)$, which signal is generated by a second control circuit 10' which has the same construction as the control circuit 10 and is used for controlling the switching element S2. In a corresponding manner, the function block 18 and the control circuit 10 thus also generate a corresponding signal 20 at the corresponding second control circuit 10' at the end of a turn-on phase $T_{on}(S1)$.

What is claimed is:

1. A converter comprising:

switching elements for chopping a direct voltage, in which turn-on phases of switching elements alternate with one another;

a circuit arrangement with resonant circuit elements processing a chopped direct voltage and serving for a supply of an output voltage; and a control circuit for automatically adapting a length of dead-time phases which are present between two consecutive turn-on phases and during which said switching elements are turned off.

2. A converter of claim 1 wherein said control circuit comprises:

a first measuring device for measuring a voltage decreasing across one of said switching elements; and a first comparison device for generating a comparison signal causing said one switching element to be turned on when said measured voltage of said one switching element reaches a first threshold value during said dead-time phases.

3. A converter of claim 1 wherein said control circuit comprises:

a second measuring device for measuring a variation with respect to time of a voltage decreasing across one of said switching elements; and a second comparison device for generating a comparison signal causing said one switching element to be turned on when said variation with respect to time of said voltage decreasing across said one switching element falls below a second threshold value during said dead-time phases.

4. A converter of claim 2 wherein said control circuit comprises:

a second measuring device for measuring a variation with respect to time of a voltage decreasing across one of said switching elements; and a second comparison device for generating a comparison signal causing said one switching element to be turned on when said variation with respect to time of said voltage decreasing across said one switching element falls below a second threshold value during said dead-time phases.

5. A converter of claim 1 further comprising a timer for predetermining a maximum length of said dead-time phases.

6. A converter of claim 4 further comprising a timer for predetermining a maximum length of said dead-time phases.

7. A converter of claim 1 wherein said control circuit is an integrated circuit.

8. Apparatus for controlling at least one of switching elements of a converter in which turn-on phases of said switching elements alternate with one another, said apparatus comprising a control circuit for automatically adapting a length of dead-time phases which are present between two consecutive turn-on phases and during which said switching elements are turned off.

9. Apparatus of claim 8 wherein said control circuit comprises:

a first measuring device for measuring a voltage decreasing across one of said switching elements; and a first comparison device for generating a comparison signal causing said one switching element to be turned on when said measured voltage of said one switching element reaches a first threshold value during said dead-time phases.

10. Apparatus of claim 8 wherein said control circuit comprises:

a second measuring device for measuring a variation with respect to time of a voltage decreasing across one of said switching elements; and a second comparison device for generating a comparison signal causing said one switching element to be turned on when said variation with respect to time of said voltage decreasing across said one switching element falls below a second threshold value during said dead-time phases.

11. Apparatus of claim 9 wherein said control circuit comprises:

a second measuring device for measuring a variation with respect to time of a voltage decreasing across one of said switching elements; and a second comparison device for generating a comparison signal causing said one switching element to be turned on when said variation with respect to time of said voltage decreasing across said one switching element falls below a second threshold value during said dead-time phases.

12. Apparatus of claim 8 further comprises a timer for predetermining a maximum length of said dead-time phases.

13. Apparatus of claim 8 wherein said control circuit is an integrated circuit.

* * * * *